United States Patent [19]

Finnen

[11] 4,068,288
[45] Jan. 10, 1978

[54] TAMPER PROOF WATTHOUR METER ENCLOSURE HAVING A PERMANENT LOCKING ARRANGEMENT

[75] Inventor: Gerald W. Finnen, Raleigh, N.C.

[73] Assignee: Westinghouse Electric Corporation, Pittsburgh, Pa.

[21] Appl. No.: 685,464

[22] Filed: May 12, 1976

[51] Int. Cl.² ............................................. H02B 9/00
[52] U.S. Cl. .................................... 361/369; 324/156
[58] Field of Search ......................... 292/251, 307 R; 324/110, 156; 361/364, 369, 370, 371

[56] References Cited

U.S. PATENT DOCUMENTS

| 245,806 | 8/1881 | Tierney | 292/251 |
|---|---|---|---|
| 255,313 | 3/1882 | Mayer | 292/251 |
| 816,007 | 3/1906 | Freschl | 292/307 R |
| 1,312,970 | 8/1919 | Garbis | 292/307 R |
| 1,443,681 | 1/1923 | Goodwin | 292/251 |
| 1,969,499 | 8/1934 | Bradshaw | 324/156 |
| 3,636,498 | 1/1972 | McQuarrie | 361/370 |
| 3,846,677 | 11/1974 | Keever | 361/364 |
| 3,928,788 | 12/1975 | Finnen | 361/369 |
| 3,943,441 | 3/1976 | Shackford | 324/110 |

Primary Examiner—Gerald P. Tolin
Attorney, Agent, or Firm—R. W. Smith

[57] ABSTRACT

A watthour meter cover is permanently locked to the meter base assembly by an irremovable fastener applied to the base at a concealed location.

3 Claims, 4 Drawing Figures

TAMPER PROOF WATTHOUR METER ENCLOSURE HAVING A PERMANENT LOCKING ARRANGEMENT

BACKGROUND OF THE INVENTION

Field of the Invention

This invention relates to tamper proof watthour meter enclosures and more particularly to a permanent locking arrangement including an irremovable fastener securing the watthour meter cover to a base assembly.

The universal use and exposure of watthour meters at every residential and business establishment where electricity is supplied subjects such meters to vandalism and tampering. Since the watthour meter registers the amount of electrical energy to be billed for, unauthorized attempts are made to tamper with the meter movement to reduce the watthour meter indications. One deterrent to physical destruction of the meter movement is a nonbreakable meter cover such as described and claimed in U.S. Pat. No. 3,846,677 issued Nov. 5, 1974, and assigned to the assignee of this invention.

Removal of conventional watthour meters from an associated meter socket permits separation of the meter cover from the base assembly to expose the meter movement to tampering. The following U.S. patents, disclose arrangements for locking the meter cover to the base assembly: U.S. Pat. No. 1,969,499, issued Aug. 7, 1973; U.S. Pat. No. 3,928,788, issued Dec. 23, 1975, assigned to the assignee of this invention, and U.S. Pat. No. 3,943,441 issued in Mar. 9, 1976.

In the U.S. Pat. No. 1,969,499 a resilient locking strip is mounted on the meter base assembly and is biased into slots formed in the inner periphery of the meter cover. A screw extending to the back of the base assembly is threaded further into the base to bias the locking strip into a cover slot. The screw is accessible from the rear of the base and can be reversely threaded to release the locking strip from the cover slot so that the arrangement does not permanently lock the cover to the base assembly.

In U.S. Pat. Nos. 3,846,677 and 3,943,441 clip arrangements are disposed which interlock the inner mating mounting surfaces of the meter cover and base assembly. A specially designed clip configuration is required for preventing unlocking rotation of the meter cover relative to the base assembly.

SUMMARY OF THE INVENTION

In accordance with the present invention a tamper proof watthour meter enclosure having a permanent locking arrangement includes a cup-shaped cover having a peripheral mounting flange with a rear side surface which mates with the outer periphery of a base assembly. A hole is provided in the rear of the mating surface of the cover at the forwardly concealed location. An aperture extends through the outer periphery of the meter base assembly for alignment with the cover hole when the cover is assembled to the base assembly. An irremovable fastener is applied through the base assembly aperture and into the cover hole to permanently lock the cover and base assembly together. The base assembly aperture is closed to rearwardly conceal the removable fastener. In one preferred form of this invention the cover hole is internally threaded and the irremovable fastener includes a one-way screw threaded to the cover opening. A countersunk base assembly aperture receives the one-way screw so that upon locking the cover and the assembly together the head of the one-way screw cannot be turned in a reverse threading direction by a screwdriver blade. The base assembly aperture is covered by a plastic decal and/or is filled with a filler material both preferably having a color identical to the color of the base assembly.

It is a general feature of the present invention to provide a locking arrangement for a watthour meter cover and base assembly which is concealable from external observation and permits a irremovable fastener to be applied after the cover and base assembly are finally assembled together. Other features and advantages of this invention will become apparent from the detailed description of the drawing briefly described hereinafter.

DESCRIPTION OF THE PREFERRED EMBODIMENT

Figure 1:
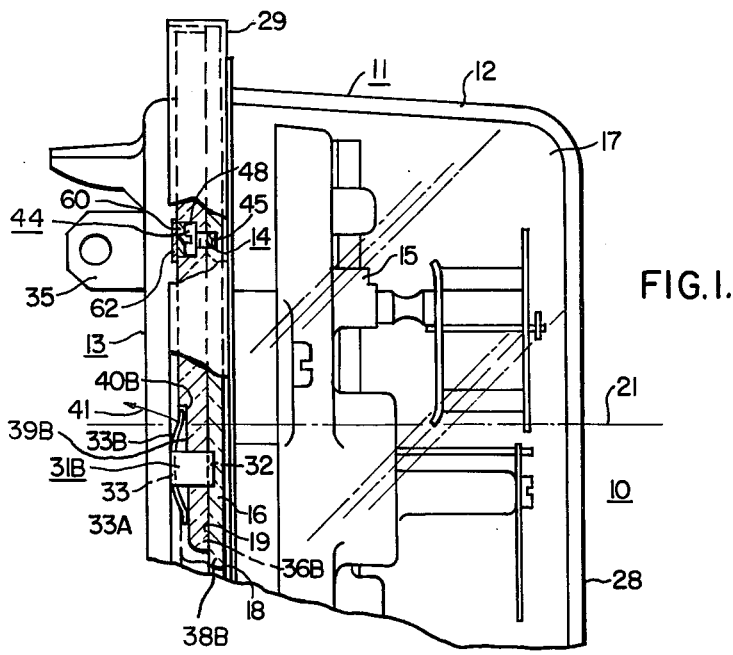
FIG. 1 is a fragmentary side view, partially in section, of the watthour meter including a tamper proof watthour meter cover permanent locking arrangement made in accordance with present invention.
Figure 2:
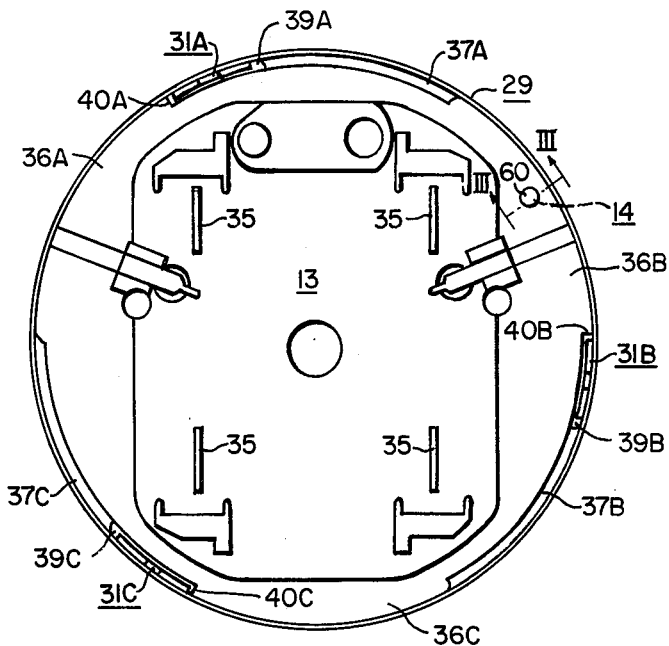
FIG. 2 is a rear plan view of a watthour meter shown in FIG. 1.

Referring now to the drawings and more particularly to FIGS. 1 and 2, there is illustrated a self-contained watthour meter 10 having a tamper proof enclosure 11. A cup-shaped cover 12 is permanently locked to a base assembly 13 by a locking arrangement 14 made in accordance with the invention. The cut-away portion at the upper left-hand portion of FIG. 1 illustrates the locking arrangement 14. An induction watthour meter movement 15 is carried by the base assembly 13 within the protected chamber formed by the meter enclosure 11. In one preferred form, the locking arrangement 14 is included in an enclosure 11 having a cover 12 made of an unbreakable plastic material and a base assembly 13. The cover and base assembly are substantially identical to the corresponding cover and base assembly described in the aforementioned U.S. Pat. No. 3,846,677, incorporated herein by reference, except as they are modified to include the locking arrangement 14 as described in detail hereinbelow. However, it is to be understood that the present invention is not limited to the specific cover 12 and base assembly 13 disclosed herein and other known two-part self-contained watthour meter enclosures can include the locking arrangement 14 made in accordance with the present invention.

The cover 12, as described in the aforementioned view as U.S. Pat. No. 3,846,677 is made of a suitable molded plastic composition preferably of polycarbonate plastic composition. The polycarbonate plastics are known to have high strength impact resistance so as to be protected from either accidental and intentional breakage. The plastic composition further prevents tampering of the watthour meter movement 15 by breakage of the meter cover which is more easily done when the covers are made of a conventional glass composition.

Figure 3:
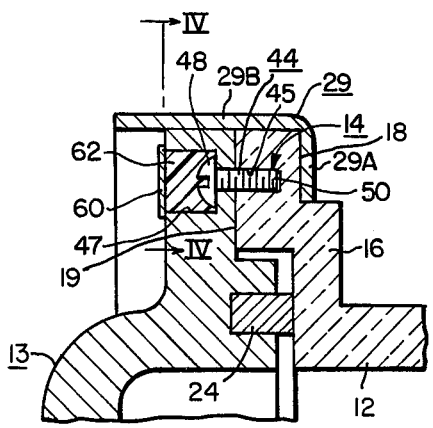
FIG. 3 is a sectional view taken along the axis III—III in FIG. 2 looking in the direction of the arrow.

The general mounting features of the cover 12 and base assembly 13 are described hereinafter for better understanding of the locking arrangement 14. The cover 12 has a cup-shaped configuration including a generally circular cross-section. A circular mounting flange 16 extends radially outward to define the outer periphery at the open end of the cover 12. When the cover 12 is attached at the flange 16 to the base assembly 13, the enclosure 11 forms a protective chamber 17 for the movement 15, circumscribed by the inner surfaces of the cover and base assembly. Front and rear side radial surfaces 18 and 19 of the flange 16 are substantially flat annuli and extend substantially radially to a center longitudinal axis 21 of the enclosure 11 including the cover 12. The rear side surface 19 is stepped forward, as best seen in FIG. 3, to form an annular axially offset shoulder engagable with a suitable sealing ring 24 to form the tight seal between the rear surface 19 and the base assembly 13.

The closed end of the cover 12 includes a front face 28 which is transparent as is the composition forming the cover 12 for viewing the dial plates of the watthour meter movement 15. A metal locking rim 29 has a configuration as described in the aforementioned U.S. Pat. No. 3,846,677 having a forward end projecting radially inward to define a narrow inturned flange 29A which fits over the forward side surface 18 of the cover flange 16 as best shown in FIG. 3. A thin cylindrical body 29B of the rim 29 covers the outer peripheral edge of the cover flange 16 extends further axially rearward so as to also overlap the outer peripheral edge of the base assembly 13. A series of three locking tabs 31A, 31B and 31C, the locking tab 31B being shown in a broken away portion in FIG. 1, are slot welded to the inner wall of the rim body 29B for fixedly clamping the cover flange 16 to the base assembly 13. The locking tab 31A has a general U-shape side cross-sectional configuration, not shown, having an inner leg 32 positioned against the rear side surface 19 of the cover flange 16. An outer leg 33 of the locking tab 31A is spaced actually rearward of the rear side surface of the cover flange 16 and includes resilient wing projections 33A and 33B.

The base assembly 13 has the meter movement 15 mounted thereon and includes contact blades 35 which extends to the rear of the base 13 for engagement with contact jaws of a meter socket not shown. Arcuate attachment lugs 36A and 36B and 36C, shown in FIG. 2, extend radially outward at the other periphery of the base assembly 13 having arcuate spaces 37A, 37B and 37C therebetween.

The attachment lugs 36A, 36B and 36C have front side radial surfaces, the front side surface 38B of the lug 36B being shown in FIG. 1, extending substantially perpendicular to the center axis 21. As described in the aforementioned U.S. Pat. Nos. 3,846,677 and 3,928,788, the front side radial surfaces of lugs 36A, 36B and 36C form flat mating surfaces with the rear side surface 19 of a cover mounting flange 16. The spaces 37A, 37B and 37C permit the tab wing projections 33A and 33B of each of the locking tabs to extend beyond the attachment lug so that the wing projections 33A and 33B slide onto rear camming surfaces at the rear of the lugs 36A, 36B and 36C respectively. Rotational mounting of the cover 12 requires a clockwise direction of the cover 12 relative to the base assembly 13 from the forward end of the cover. The camming surfaces 39A, 39B and 39C are formed by arcuate and tapered slots having closed ends 40A, 40B and 40C, respectively, and extending arcuately along the rear outer periphery of the arcuate attachment lugs 36A, 36B and 36C. An open slot end of each of the camming surfaces is located at most counter-clock-wise edge of the attachment lugs as shown in FIG. 2. The tip end of the tab wing projection 33B, as shown in FIG. 1 engages the end 40B of the camming surface 39B. This seats the locking tabs so that the cover 12 is in a final mounting position.

It should be noted that the wing projection 33B of the locking tabs can be pried or bent axially rearward as indicated by the directional arrow 41 in FIG. 2. This releases the projection 33B from slot end 40B and in the same manner tabs 31A and 31C can be released from the slot ends 40A and 40C so that the cover can be rotated from the front, further clockwise when the locking arrangement 14 of this invention is not included. This permits the cover to rotate until the tabs are within the notch spaces 37A, 37B and 37C to permit axial separation of the cover 12 from the base assembly 13.

Referring now to the permanent locking arrangement 14 made in accordance with this invention, an irremovable fastener 44 secures the cover 12 to the base assembly 13 as shown in FIGS. 1 and 3. A hole 45 the cover 12 has a complementary size and configuration for receiving the fastener 44, in a fixed relationship to the cover flange 16. A hole is initially formed in a conventional manner such as by drilling to be complementary in size to receive the fastener 44 and to extend only partially through the cover flange 16. The hole 45 preferably has a radially outward position behind a narrow flange 29A of the locking rim 29. This places the hole and the end of the fastener 44, since the material of the cover 12 is transparent, at a concealed position when viewing the enclosure from the forward cover end.

A countersunk aperture 47 is formed through the base assembly 13 in axial and concentric alignment with the cover hole 45 when the cover 12 is in the final assembled position as shown in FIGS. 1 and 3. The hole 45 is tapped to have internal screw threads mating with the thread of the fastener 44 which is shown as a one-way torque machine screw having a head portion 48 which engages the annular shoulder formed between the larger and smaller bores of the counterbored bore of the aperture 47. The threaded shank 50 of the fastener 44 has complementary threads for threading engagement with the threads of the cover hole 45. Alternatively, self-tapping threads are provided on the shank 50 and the cover hole 45 is not tapped and is sized so the plastic material around the hole 45 will receive the self-tapping shank.

Figure 4:
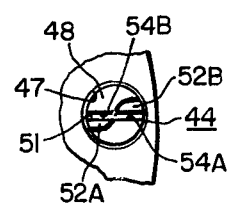
FIG. 4 is a sectional view taken along the axis IV—IV in FIG. 3 looking in the direction of the arrow.

The end view of one manner of forming the head 48 of the one-way fastener 44 as shown in the FIG. 4 in which the end 48 is provided with a partial slot portion 51. Camming surfaces 52A and 52B are tapered upwardly in a clockwise direction on diametrically opposite portions of the partial slot 51 and terminate at opposite and longitudinally spaced slot side portions 54A and 54B. Accordingly, a blade of a screwdriver tool positioned in the slot 51 and rotated clockwise causes the blade to engage the slot side portions 54A and 54B and rotationally thread the fastener 44 into the hole 45. Upon seating the fastener 44 in tight threaded relationship, any attempt to remove the fastener 44 by rotating a screwdriver blade in a counter-clockwise direction causes the blade to ride up the camming surfaces 52A and 52B and therefore prevent counterclockwise or unthreading rotation of the fastener from the cover flange. This irremovable feature of the fastener 44 causes the enclosure to be permanently sealed and locked by permanently fixing the cover 12 to the base assembly. Rotation of the cover 12 in a direction to slide the locking tabs into the notch spaces 37A, 37B and 37C is not possible.

The rear opening of the hole 47 is preferably covered by a thin decal or disc 60 covering means made of a plastic material and having an adhesive on one side which adheres to the rear side of the base assembly around the rear opening of the hole 47. Also, the space of the countersunk bore aperture 47 above the fastener head 48 can be filled with a material 16 which is a thermosetting or airdrying adhesive and filler composition, shown in FIG. 3 with the covering disc 60 applied over that. Preferably, the color of the disc 60 and the filler composition 62 have substantially identical colors, such as black as is the color of the base assembly 13. The noncontrasting appearance of the disc 60 makes the fastener 44 and the hole 47 concealed from observation of the enclosure 11 at the rear of the base assembly 13.

The permanent locking arrangement 14 of the tamper proof enclosure 11 is easily employed in field conditions by simply applying the fastener 44 into the base aperture 47 and cover hole 45 and fixing the fastener 44 to the cover by threadingly inserting it into the cover flange 16 with a conventional screwdriver tool. Upon final assembly of the fastener 44 to the cover flange 16 the hole 47 may be enclosed with the adhesive and filler material 62. The material 62 may be omitted in field conditions and simply employing the plastic disc 60 alone conceals the opening of the aperture 47 and the head 48 of the fastener 44. Even if the disc 60 is removed the fastener 44 is irremovable from the hole 45 since it is impossible to rotate it in a counter-clockwise or unthreading rotational direction.

It is contemplated that the tamper proof watthour meter enclosure having a permanent locking arrangement may be modified from the embodiments described hereinabove without departing from the spirit and scope of this invention.

What I claim is:

1. A tamper proof watthour meter enclosure comprising:

a base assembly supporting a watthour meter movement, said assembly including plural arcuate attachment lugs extending radially at the outer periphery thereof in spaced apart relationship, said attachment lugs having forward and rear side radial surfaces thereon;

a plastic cup-shaped cover including a closed forward end and an open end, said cover further including a circular mounting flange extending radially outward at said rear open end, a rear radial side surface of said mounting flange mating with said front radial side surfaces of said attachment lugs, said cover further including a locking rim having a forward inturned flange extending around said mounting flange and further having a cylindrical body portion carrying tab members rotationally attaching said cover to said attachment lugs to enclose said watthour meter movement within a protective chamber;

a permanent locking arrangement including a hole extending into the rear side surface of the cover mounting flange at a radial position behind said inturned flange so as to have a concealed location thereunder, an aperture in said base assembly aligned with said hole of said cover flange, an irremovable fastener means having a threaded shank portion applied through said base assembly aperture and threadedly attached to said cover flange around said flange hole, said fastener means further having a one-way head portion including a partial screwdriver slot terminating at opposite camming surfaces with said head portion being recessed within said base assembly aperture, and covering means applied to said base assembly over said aperture to conceal said fastener and said base assembly aperture.

2. The tamper proof watthour meter enclosure as claimed in claim 1 including a noncontrasting plastic disc means adhesively secured to the base assembly around the aperture of said base assembly.

3. The tamper proof watthour meter enclosure as claimed in claim 1 including a filler material in the space of said base assembly hole above the head portion of said fastener.

* * * * *